Dec. 14, 1926.
C. F. RABENOLD
1,610,317
GLARESHIELD
Filed May 28, 1925
2 Sheets-Sheet 1
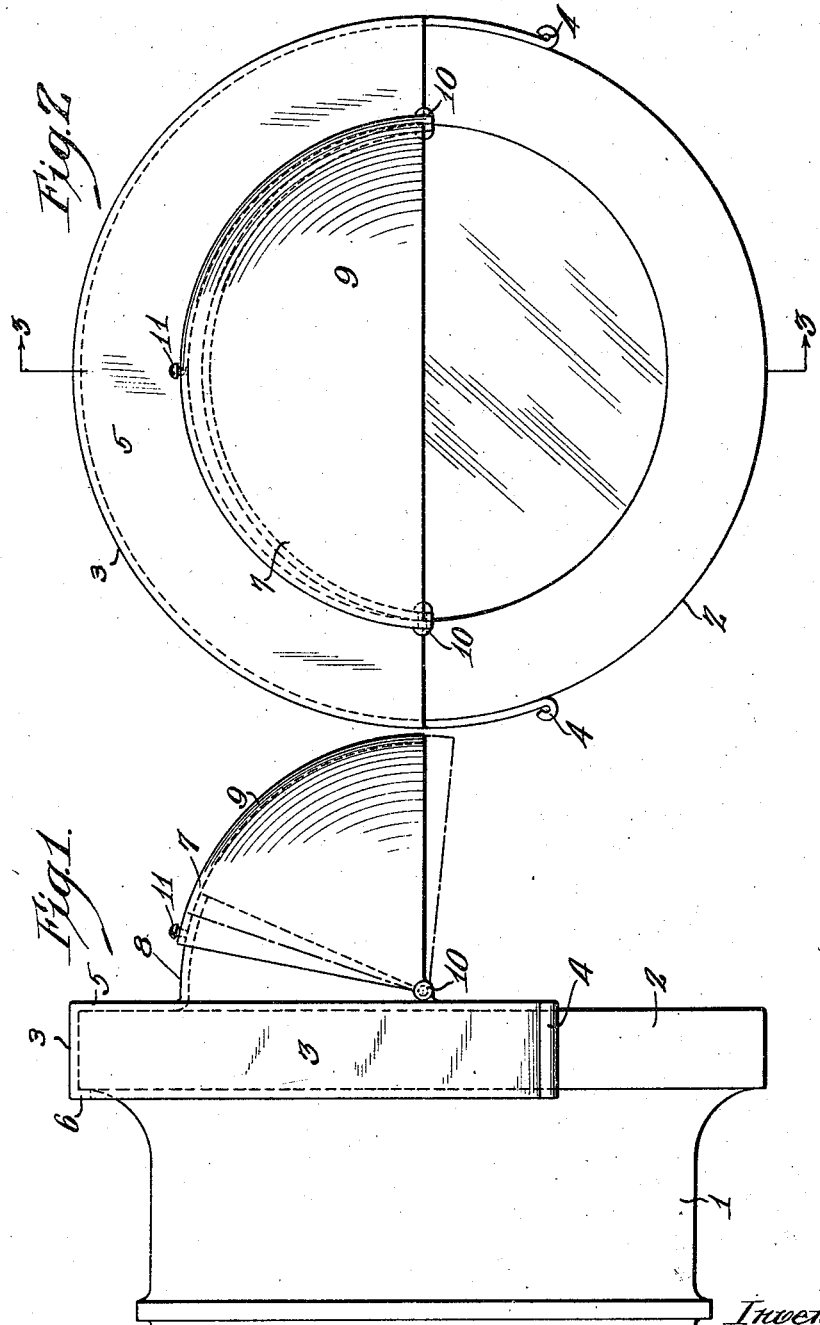

Dec. 14, 1926.                  C. F. RABENOLD                    1,610,317
                                  GLARESHIELD
                              Filed May 28, 1925           2 Sheets-Sheet 2
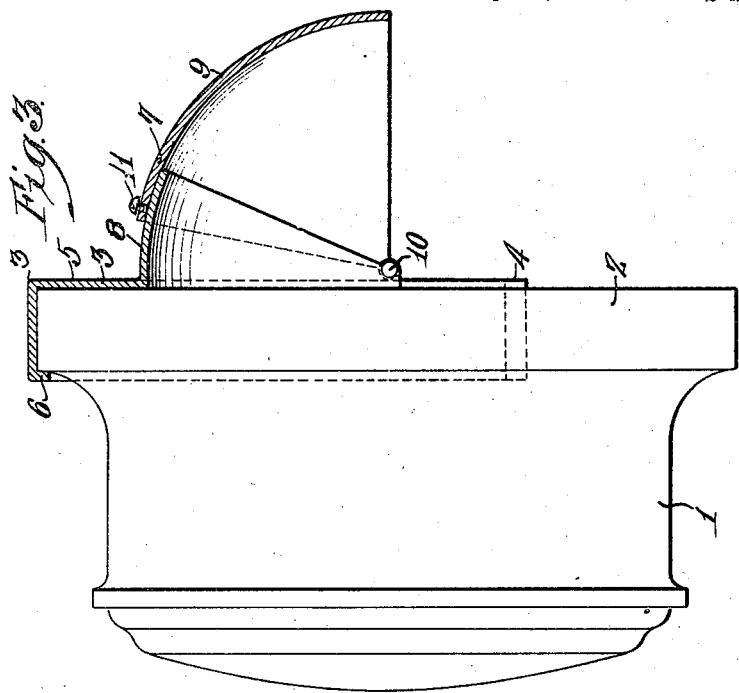
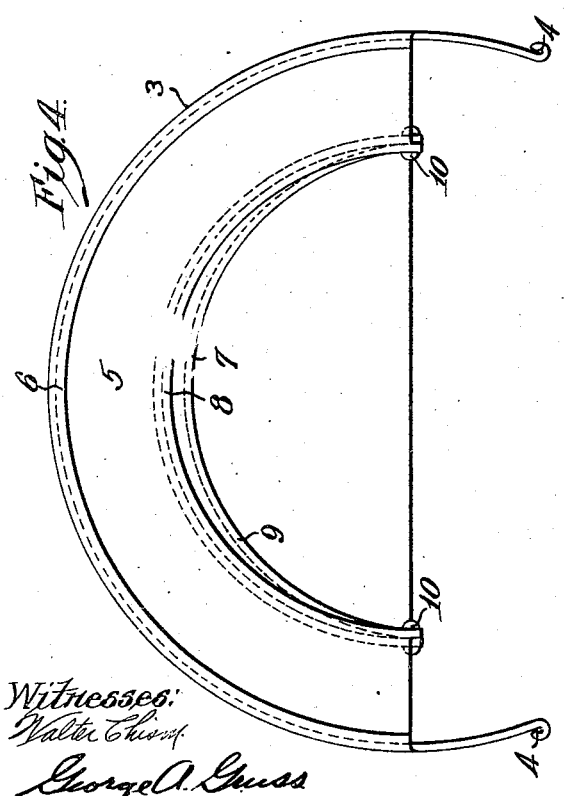
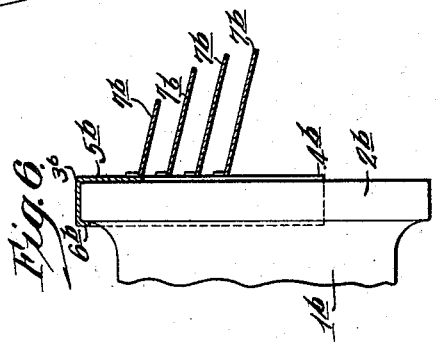
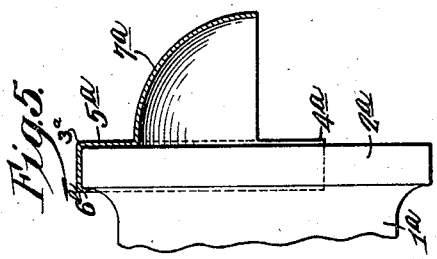
Inventor:
Charles F. Rabenold.
by Joshua R. H. Potts
his Attorney.

Patented Dec. 14, 1926.

1,610,317

UNITED STATES PATENT OFFICE.

CHARLES F. RABENOLD, OF PHILADELPHIA, PENNSYLVANIA.

GLARESHIELD.

Application filed May 28, 1925. Serial No. 33,325.

My invention relates to glare shields especially adapted for use with headlights on automobiles.

The objects are to provide a glare shield of simple and neat construction which may be quickly and firmly attached to the rim of a headlight and which will shield the glare of the light coming from the upper part of the headlight.

These objects, and other advantageous ends which will be described hereinafter, I attain in the following manner, reference being had to the accompanying drawings in which—

Figure 1 is a side view of a glare shield made in accordance with my invention illustrating it applied to a headlight, Figure 2 a front view of the shield and headlight shown in Figure 1, Figure 3 a section on line 3—3 of Figure 2, Figure 4 a rear view of the shield, and Figures 5 and 6 views similar to Figure 3 drawn on a small scale showing modified forms.

Referring to the drawings, 1 indicates a headlight having a rim 2 and my improved shield attached to and embracing the major portion of the rim. The shield has a frame 3 fitting over the upper half of the rim and resilient tongues 4 depending from the opposite sides of the frame and pressing against the sides of the lower half of the rim. The frame is of channel cross section. The front leg 5 of the channel is longer than the rear leg 6. A shielding hood 7 is made in sections 8 and 9. Section 9 is pivoted on section 8 at 10 and securely held thereto in adjusted position by a screw 11 or other suitable fastening means. Section 8 is preferably integral with leg 5 of the frame but may be made separate and secured to the leg in any suitable manner.

In Figure 5, I have shown the shielding hood 7$^a$ made in one piece and non-adjustable. In all other respects the glare shield is similar to that shown in Figure 3 and I have therefore given corresponding parts similar reference characters with the exponent "a."

In Figure 6, I have shown the shielding hood in the form of inclined plates 7$^b$ secured to the leg 5$^b$ of the frame by flanges. In all other respects the glare shield is similar to the form shown in Figure 3, and I have therefore given corresponding parts similar reference characters with the exponent "b."

The glare shield is attached to a headlight by slipping the frame over the upper half of the rim so that tongues 4 will grip the opposite sides of the lower half and hold the frame to the rim. The sectional shielding hood is then adjusted to the proper position and fastened in place. The glare of the light passing through the upper half of the headlight is shielded and the light coming through the lower half passes to illuminate the road.

The glare shield may be made to fit any type of headlight without requiring cutting or drilling of the rim and may be readily stamped from sheet metal and produced at low cost.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:—

A glare shield for headlights consisting of a frame of channel cross section adapted to fit over the upper half of the headlight rim; resilient tongues extending from the opposite sides of the frame and adapted to grip the lower half of the rim; a shield in the form of a segment of a dome fixed thereto, a movable shield of like form hinged to the frame, telescoping the fixed shield, and means on the movable shield adapted to engage the fixed shield to hold the former in selected positions relatively to the fixed shield.

In testimony whereof I have signed my name to this specification.

CHARLES F. RABENOLD.